United States Patent [19]

Jorgensen

[11] Patent Number: 4,860,670
[45] Date of Patent: Aug. 29, 1989

[54] METHOD AND APPARATUS FOR THE CLEANING OF FLUE GAS AND THE RECOVERY OF HEAT FROM SAME

[75] Inventor: Lars L. S. Jørgensen, Brabrand, Denmark

[73] Assignee: Jydsk Varmekedelfabrik A/S, Braband, Denmark

[21] Appl. No.: 148,510

[22] PCT Filed: Jun. 3, 1987

[86] PCT No.: PCT/DK87/00067
§ 371 Date: Feb. 2, 1988
§ 102(e) Date: Feb. 2, 1988

[87] PCT Pub. No.: WO87/07701
PCT Pub. Date: Dec. 17, 1987

[30] Foreign Application Priority Data
Jun. 4, 1986 [DK] Denmark .............................. 2656/86

[51] Int. Cl.⁴ ............................................. F23J 15/00
[52] U.S. Cl. ..................................... 110/215; 55/227; 55/228; 110/345; 422/168; 422/169; 261/DIG. 9
[58] Field of Search ................ 110/215, 345; 422/168, 422/169; 55/220, 227, 228; 261/DIG. 9; 122/20 B

[56] References Cited

U.S. PATENT DOCUMENTS

| | | | |
|---|---|---|---|
| 3,438,722 | 4/1969 | Heredy et al. | 110/215 X |
| 4,019,444 | 4/1977 | Kleeber et al. | 261/DIG. 9 |
| 4,515,754 | 5/1985 | Stehning | 422/168 |
| 4,624,190 | 11/1986 | Cappi | 110/215 |
| 4,644,877 | 2/1987 | Barton et al. | 110/215 X |
| 4,718,357 | 1/1988 | Wang etal. | 110/215 X |

Primary Examiner—Edward G. Favors
Attorney, Agent, or Firm—Antonelli, Terry & Wands

[57] ABSTRACT

A the method and apparatus for cleaning of flue gas from a boiler, and the recovery of heat from gas, the flue with the flue gas being led from the boiler through a heat exchanger in such a manner that it still has a temperature above the acid dew point. The flue gas is then led to a scrubber tower and is washed with a scrubber fluid from a sedimentation tank. The pH value of the scrubber fluid is measured with a measuring element and a liquid additive base is introduced from a tank. The sediment in the sedimentation tank is fed into a high-speed reactor, from which a basic fluid is led to one or more collection vessels supplied with clean gas from a chimney via a blower resulting in the formation of CaCO₃ which, not being easily dissolved, is precipitated. The cleaned base is fed to the tank. The high-speed reactor is supplied with lime water through a ring main and a dosing pump from a lime water plant.

16 Claims, 1 Drawing Sheet

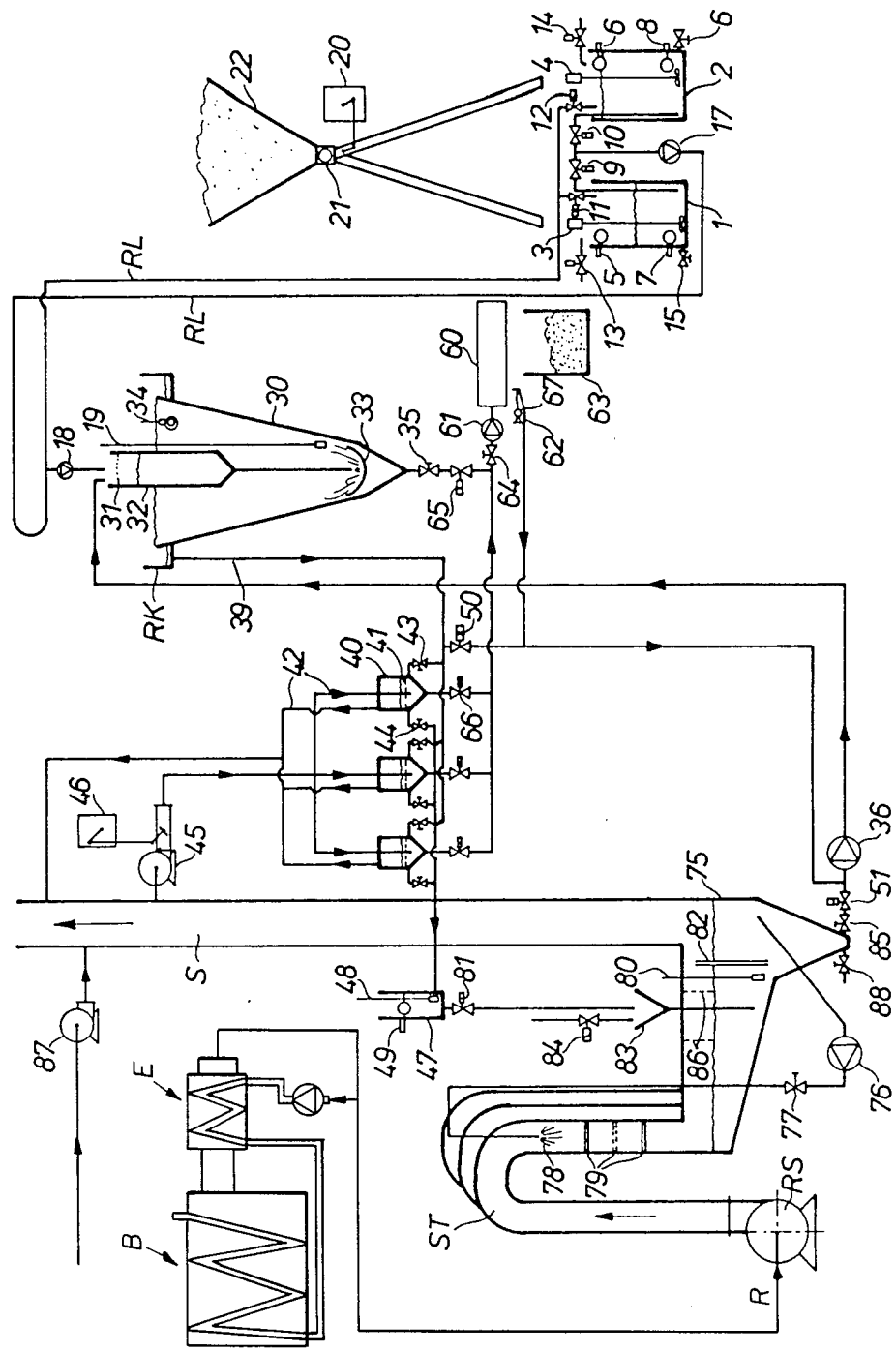

METHOD AND APPARATUS FOR THE CLEANING OF FLUE GAS AND THE RECOVERY OF HEAT FROM SAME

BACKGROUND OF THE INVENTION

The invention relates to a method and plant for the cleaning and desulphurization of flue gas from the combustion of sulphurous fuels, and the recovery of heat from the flue gas, whereby the flue gas is conducted from a boiler through a heat exchanger.

When burning fossil fuels such as coal and oil in boiler plants, a flue gas arises which, in accordance with the relevant environmental regulations, must maintain stipulated norms in order to be able to be discharged into the atmosphere. The flue gas also contains a certain amount of thermal energy, even from boiler plants with economizers, whereby the feed water is heated by the flue gas before it is fed to the boiler plant. For reasons of economy, it is therefore desirable to recover as great an amount of the thermal energy as possible from the flue gas.

It is known to clean the smoke and recover a part of the thermal energy existing in the flue gas, in that one leads the flue gas from the economizer to a flue gas-air heat exchanger in which one heats the combustion air, which is to be fed to the boiler's combustion chamber.

Downstream of the heat exchanger, a smoke cleaner is provided in which a scrubber fluid, e.g. lime water, is used to remove acids and particles from the smoke, after which the flue gas can be conducted to the chimney and out into the atmosphere.

These known installations have several drawbacks. The smoke is cooled down considerably by using a flue-gas-air heat exchanger after the economizer, thus reducing the temperature of the flue gas to below the dew point of the acid, so that the acid is condensed and settles in the heat exchanger. This must therefore be made of an acid-resisting material, e.g. acid-resisting steel or glass, which results in a very expensive heat exchanger. As a rule, the flue gas from fossil fuels contains a smaller amount of lime connections, the result being that the particles in the flue gas become chalky and, in connection with the acid, thus form a gypsum paste which quickly blocks the heat exchanger. The heat exchanger must therefore be frequently cleaned, which is difficult. Known systems use vigorous flushing with water in order to clean the heat exchanger, but this gives rise to acidiferous water which must be neutralized before it can be led away. During the flushing periods, which are quite frequent, the heat exchanger cannot be used, the result being that the smoke must be conducted around the heat exchanger, whereby one loses some of the heat recovery, or a change must be made between two heat ecxhangers, which considerably increases the costs of the plant.

The aim underlying the present invention essentially rsesides in providing a method and a plant for cleaning and desulfurization of flue gas from the combustion of sulfurous fuels and recovery of heat from the flue gas which avoids, by simple means, shortcomings and disadvantages encountered in the prior art.

In methods and plants for cleaning a flue gas and recovery of heat from the same, the flue gas from a boiler is lead through a heat exchanger for water, a so-called economizer, and subsequently washed with a scrubber fluid before being lead to a chimney possibly by way of means which filter out drops of liquids with the thermal energy being collected in the scrubber fluid being reused.

According to the method of the present invention, the flue gas is cooled on its way through the economizer only so much that it still has a temperature above the acid dew point when the flue gas meets the scrubber fluid, and the scrubber fluid is maintained substantially at a neutral pH value by an addition of base in the liquid form, and an additive base is produced by the use of lime through a double alkaline process between the lime and the scrubber fluid in a high speed reactor wherein the pH value is maintained in a range of 8.5–10.5 and, preferably, at approximately 9.5.

In the plant or apparatus for cleaning of the flue gas of the present invention, a means is provided for feeding the gas flue through the economizer in such a manner that the flue gas still has a temperature above an acid dew point when the flue gas meets the scrubber fluid in the scrubbing elements, with a means for measuring the pH value of the scrubber fluid, with the measurement from the measuring means determining the addition of the liquid additive base from a tank so that the scrubber fluid is maintained substantially neutral, and means are provided for connecting the tank to a high speed reactor which is supplied with a precipitous sediment and liquid from the sediment tank with the sediment and liquid being led down through a substantially vertical downpipe together with a lime-water suspension from a mixing vessel.

The temperature of the flue gas is controlled in a known manner by using a motor valve to control the supply of water to the economizer. The flue gas from the boiler is led through the economizer and filtered direct to a smoke washer, in that one thus uses the smoke washer both for cleaning the smoke of acid and residual particles and also for a further cooling of the smoke, in that the scrubber fluid is heated by the flue gas, and the heated scrubber fluid is conducted, for example, to a water-air heat exchanger, a so-called calorifier, in which the combustion air for the combustion in the boiler is heated.

It is known to use various neutralization agents as base, e.g. lime, sodium hydroxide, ammonia etc., to hold the scrubber fluid neutral. Both ammonia and sodium hydroxide are bases which are easy to use and do not demand particularly high plant investments, but they have the disadvantage that the salt concentration becomes so great that it is necessary to divert much of the base and dilute it with water. The problem of air acidification is thus moved to become a discharge problem with contents of salts and heavy metals. From the operation point of view, both ammonia and especially sodium hydroxide are relatively expensive neutralization agents.

It is known to use lime in different ways as neutralization agent, either as a dry process, a dry/wet process or a wet process. The dry process has the disadvantage that the consumption of lime is quite large and increases progressively with increased reduction of the content of acid in the flue gas, to which must be added a greater amount of reject which has to be deposited. The dry/wet process reduces the consumption of lime and the reject in comparison to the dry process, but gives rise to cleaning problems between the dry and the wet zone because of the unavoidable formations of gypsum. The wet process's consumption of lime is linearly related to the amount of acid it is desired to remove, which means that the lime consumption and the reject is less than with the two other processes. The difficulties with the wet process are that the undissolved particles of lime result in the formation of gypsum crystals in the plant, which must therefore be cleaned very frequently.

With the present invention the known problems are avoided, while at one and the same time one achieves effective cleaning of the flue gas, a reduced consumption of lime and a reduction of the reject to an absolute minimum.

In accordance with further advantageous features of the plant of the present invention, a sieve is arranged upstream of the vertical pipe, a lowest portion of the high speed reactor includes a concave shield which is hit by the water/sediment jet and turns the stream upwards, and lime water is added to the water/sediment jet through the sieve by means of a dosing, which is controlled by a pH sensor in the high-speed reactor in such a manner that the pH-value in the high-speed reactor is held at approximately 9.0. By virtue of such arrangement, one is able to filter out crystals and larger solid particles, hereby avoiding packing of the reactor and blockage of the sludge outlet, and one can check the sieve visually and change it as required. One also achieves a very good mixing of the lime water with the water/sludge-liquid, the reason being that there is turbulent flow in the downpipe, so that the mixing takes place before the liquids reach into the actual reactor, in which there is a lower velocity of flow and therefore laminar flow. The turning-shield ensures that the speed of the water in the reactor immediately after the turning-shield is almost uniform throughout the whole of the cross-section of the high-speed reactor, except for the area along the wall. Finally, the clearance between the wall of the reactor and the turning-shield results in the sludge being able to pass down the inner wall of the high-speed reactor, past the turning-shield and down into the base cone of the reactor under the turning-shield. One thus achieves an easier separation of the lighter and/or smaller particles than is the case with known high-speed reactors, which is of great significance because the flue-gas cleaning process introduces many particles (sand, coke etc.) into the added water/sludge-liquid, and this leads to many small particles (crystals) being formed in the reactor.

It is also possible in accordance with the method of the present invention to treat the additive base, prior to being introduced into the scrubber fluid, by the addition of clean gas extracted after the flue gas is past through the scrubber fluid whereby the pH value of the other base is reduced to a substantially neutral value during simultaneous precipitation of possible remains of undissolved calcium hydroxide.

In the plant or apparatus of the present invention, a clean gas take off supplies clean gas extracted from the chimney through pipe lines to the additive base, with the base being stored in one or more collection vessels disposed between the high-speed reactor and the tank after which the clean gas is returned to the chimney.

By virtue of the last noted features of the present invention, all of the reject is sent back to the process and no diversion whatsoever of the solution to the discharge drainage system needs to be effected. Everything which is scrubbed from the flue gas and all of the lime which is added becomes a substantially dry shuffable residual product which can be easily deposited.

In order to provide advantageous regulation of the practice of the present invention and enable a full automation of the entire process, the pH value of the additive base is in the range of 6.9–7.6 when it is added to the scrubber fluid. The amount of clean gas which is added to the additive base is controlled by measuring the pH value of the additive base immediately before introduction into the scrubber fluid, and the amount of additive base which is introduced in the scrubber fluid is controlled by measuring the pH value of the scrubber fluid.

To realize the above mentioned regulation of the process of the present invention in the apparatus or plant, the tank in which the additive base is collected before being introduced into the scrubber fluid comprises a measuring element for the measurement of the pH value, with the measuring element being used to control a regulation element for the amount of clean gas which is added to the collection vessel.

Advantageously, the sedimentation tank contains a device for measuring the pH value, and the introduction of the additive base is controlled by the result of the measurement.

In accordance with still further features of the present invention, the sediment from the collection vessel or vessels and from the high-speed reactor is lead to a centrifuge, preferably a decanter centrifuge and the centrifuged liquid is returned to the system, for example, to the high-speed reactor and the substantially dry sludge from the centrifuge is collected in a container.

In accordance with still further features of the plant or apparatus of the present invention, the sedimentation tank, the scrubber element and the remaining parts which come into contact with the scrubber fluid, for example, the flushing jets, scrubber elements, etc. are made of or cased with glass, porcelain or other acid or base proof materials whereby the overall lifetime and operational reliability of the plant or apparatus is increased by virtue of the elimination of the formation of gypsum crystals on these materials.

BRIEF DESCRIPTION OF THE DRAWINGS

The invention will now be described in more detail with reference to the single FIGURE of the drawing, which is a schematic diagram of the method and the plant of the present invention.

DETAILED DESCRIPTION

After the smoke R has left the boiler B, the flue gas is led through an economizer E where it is cooled to approx. 80° C., which is above the acid dew point for the flue gas, after which the flue gas is led through a possible filter where most of the particles in the flue gas are removed. The flue gas is conveyed through the smoke suction apparatus RS and further to the scrubber tower(s) ST with scrubbing elements 79. The flue gas is pressed vertically down through the tower and then passes horizontally through a sedimentation tank 75 and led to the chimney S.

In the scrubber tower ST, the smoke R is washed by jets 78, scrubbing elements 79 and drip-catchers 86. When the flue gas thereafter leaves the sedimentation tank 75, it is cooled down to 45°–50° C. $SO_2$ and solid contents are reduced by 85–90% in relation to the amounts at the outlet from the filter.

After the flue gas has passed the scrubber system it has been completely or partly saturated with steam, which means that the flue gas suction apparatus must be able to deliver the extra pressure necessary to conduct the flue gas through the chimneys. Alternatively, one can add approx. 5% hot flue gas which is taken after the boiler B by the flue gas suction apparatus 87.

The water for jet system is taken from the sedimentation tank 75 and is pressed by a pump 76 to nozzles or jets 78 in the scrubber tower(s) ST, after which it runs back to the sedimentation tank 75.

The consumption of water with this process will be approx. 0.01 l per kg of stocked coal, for which reason a supply of fresh water is provided through a valve 84 which is controlled by a liquid-level detector 82.

For reasons of the low velocity of flow in the sedimentation tank 75, the solid particles will sink to the bottom and end in the inverted pyramid in the lowest part of the tank 75. Due to the shape of the tank 75, the water in the pyramid will be static, the result being that a thickening of the solids in the flushing water will occur. At the pyramid's pointed bottom, a pump 36 is connected which forces water and sediment up into a vertical downpipe 32 of a high-speed reactor 30.

The inlet to the vertical downpipe 32 on the high-speed reactor 30 is provided with a sieve 31, so that crystals and similar solid materials from the sedimentation tank 75 are filtered out. One thus avoids packing in the reactor and possible blockage of the sludge discharge through the discharge valve 35. The sieve 31 can very simply be checked visually and changed during operation.

Water and sediment run down through vertical downpipe 32. At the bottom and centrally of the high-speed reactor 30, the jet of water/sediment hits a concave turning-shield 33 which turns the water stream upwards. For reasons of the constantly decreasing speed at which the water flows up through the high-speed reactor 30, a build-up of particles will occur which gradually becomes so heavy that the particles sink down through the water, past the turning-shield 33 and down into the pointed bottom of the high-speed reactor 30. In the direction of flow, the high-speed reactor 30 has increasing cross-sectional dimensions, so that one achieves a constantly decreasing water velocity. The high-speed reactor 30 is in the form of a cone with the apex downwards. The turning-shield 33 is disposed in the vicinity of the pointed bottom, and is shaped in such a way that it fills out a relatively large part of the cross-sectional area, but not more than particles etc. are able to sink down between the turning-shield and the wall of the reactor and are collected in the bottom of the cone.

For the reason that the water in the flushing system has absorbed $SO_2$ and formed $H_2SO_3$, the water/sediment from the sedimentation tank 75 will be acid with a pH value of approx. 6. The sulphurous acid is neutralized with $Ca(OH)_2$ by a lime dosage system which is described in more detail hereinbelow.

$Ca(OH)_2$ is dispensed from a silo 22 to the mixing vessels 1 and 2 where it is mixed with water supplied via the valves 13 and 14. This is carried out under constant stirring by, for example, the mechanical stirrers 3 and 4, until an approx. 10% suspension is obtained, depending on the sulphur content of the fuel.

From one of the mixing vessels 1 or 2, a common pump 17 sends the $Ca(OH)_2$-suspension through a ring main RL back to the vessel 1 or 2.

The ring main RL is provided with a branch through which a dosing pump 18 adds the $Ca(OH)_2$-suspension to the water in the high-speed reactor 30. The dosing pump 18 is controlled by a pH sensor 19 in the reactor 30, thus holding the pH value in the high-speed reactor 30, at approx. 9.0.

When the vessel 1 is empty, a float 7 switches the system to vessel 2, in that the solenoid valves 10 and 12 are opened and 9 and 11 are closed. A damper 20 is then reversed to vessel 1, whereby vessel 1 is filled with $Ca(OH)_2$. A worm 21 conveys the $Ca(OH)_2$ to vessel 1. The solenoid valve 13 adds water to vessel 1. When vessel 1 is full, a float 5 halts the supply of water by closing the valve 13. In a corresponding manner, vessel 2 is maneuvered during filling by the floats 6 and 8.

The amount of $Ca(OH)_2$ to be added is determined by a revolution counter on the shaft of the worm 21.

After the chemical reactions, and when the water has left the high-speed reactor 30 through the overflow and runs over into the high-speed reactor's surrounding chamber RK, the water should not contain any $Ca(OH)_2$. However, experience has shown that there still remains small amounts of $Ca(OH)_2$, which can result in considerable inconvenience during operation.

In order to avoid these inconveniences, and to remove the last remains of undissolved $Ca(OH)_2$, a system with one or more collection vessels 40 is provided between the high-speed reactor 30 and the scrubber system.

The water from the chamber RK surrounding the high-speed reactor 30 runs through a pipe 39 to the collection vessels 40.

From the clean gas outlet of the sedimentation tank 75 to the chimneys, an amount of clean gas is taken by pressure blower 45 and is pressed through the water in the collection vessels 40 via the inlet channel 42. After having been through the water in the collection vessels 40, the clean gas then leaves the vessels 40 through the outlet channel 42 to the chimney S. The direction of flow of the clean gas, which has a very high content of $CO_2$, is shown by the arrows. The water from the chamber RK on the high-speed reactor 30 has a pH value of approx. 9.5, and together with the $CO_2$ in the clean gas it will react with the $Ca(OH)_2$ remaining in the water and form $CaCO_3$. Since $CaCO_3$ is not exactly dissolved, it will sink to the bottom of the collection vessels 40, after which it can be tapped off through the valves 66.

The water from the collection vessels 40 runs over into a tank 47. provided with a pH sensor which controls a smoke throttle 46 for the supply of clean gas to the collection vessels 40. This is effected in such a way that the pH value is held at 7.0. To maintain a constant water level in the collection vessels 40, the tank 47 is provided with a float 49. When the float 49 is in the uppermost position, a valve 51 is closed and a valve 50 is opened. When the float 49 is in the lower position, valve 51 opens and valve 50 closes.

The water from the tank 47 runs down into the sedimentation tank 75. The amount which runs down into the sedimentation tank 75 is regulated by a pH sensor 80, in that a valve 81 opens when the pH value in the sedimentation tank 75 is below 6.0. Both the clean water through the valve 84 and the water from the tank 47 through the valve 81 are fed into the tank 75 via a funnel element 83.

The sediment which settles in the high-speed reactor 30 and the collection vessels 40 is conveyed by a pump 61 to a decanter centrifuge 60. A slurry valve 65 on the high-speed reactor 30 and a slurry valve 66 on the collection vessels 40 are alternately opened and closed.

The sediment is separated from the water in the decanter centrifuge 60. The sediment, which is of a consistency which enables it to be shovelled, is collected in a container 63, while the reject runs down into a vessel 62 and is fed back into the system.

There is thus no discharge whatsoever to the drainage system, and the consumption of water is limited to the small amounts which are carried away with the sediment and the flue gas.

The thermal energy in the scrubber fluid, which absorbs residual heat from the flue gas, can be recovered by letting the scrubber fluid circulate through a water-/air heat exchanger, for example a calorifier, which heats the combustion air before this is blown into the boiler plant. Instead of a calorifier, one can extract the thermal energy from the scrubber fluid by a heat pump arrangement.

START-UP OF THE PLANT AND CHEMICAL REACTIONS.

When starting the plant, the high-speed reactor 30, the collection vessels 40 and the sedimentation tank 75 are filled with water to their normal levels.

The plant will then start-up with the exception of the lime dosing pump 18 and the clean gas blower 45.

Hereafter, the flue gas is fed through the scrubber tower ST and elements 79. Gradually, as the pH value in the sedimentation tank 75 falls below 6.0, $Na_2CO_3$ is added to the chamber of the high-speed reactor 30, and so much is added that one obtains a concentration $C_{Na}=0.1-1.5$ mol/l.

Hereafter, normal operation is initiated with the starting of the lime dosage pump 18 and the blower 45. During start-up, the chemical reactions are as follows:

In the scrubber: 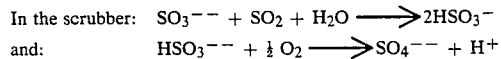
and: 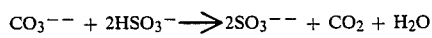
In the high-speed reactor:

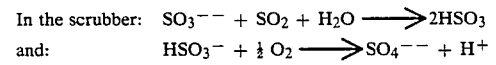

With normal operation:

In the scrubber: $SO_3^{--} + SO_2 + H_2O \longrightarrow 2HSO_3$
and: $HSO_3^- + \frac{1}{2}O_2 \longrightarrow SO_4^{--} + H^+$
In the high-speed reactor:

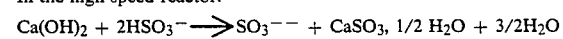

$\downarrow$ and: 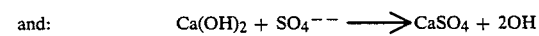

$\downarrow$

In the collection vessels: 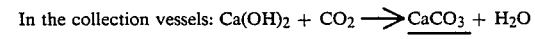

In addition to the reactions mentioned above, other reactions undoubtedly take place, but those given above must be considered as being the most essential.

I claim:

1. Method for cleaning of flue gas and the recovery of heat from same, whereby the flue gas from a boiler is led through a heat exchanger for water, an economizer, and subsequently washed with a scrubber fluid before being led to a chimney, via a means which filters out drops of liquid, and whereby the thermal energy collected in the scrubber fluid is reused, the method comprising the steps of;

cooling the flue gas on its way through the economizer, to a temperature above the acid dew point when the flue gas meets the scrubber fluid, maintaining the scrubber fluid substantially at a neutral pH value by an additive base in liquid form, and producing the additive base by the use of lime through a double alkaline process between the lime and the scrubber fluid in a high-speed reactor, wherein the pH value is maintained in a range of 8.5–10.5.

2. Method according to claim 1, wherein prior to being introduced into the scrubber fluid, the additive base which may include undissolved calcium hydroxide is treated by the addition of clean gas extracted after the flue gas has passed through the scrubber fluid, whereby the pH value of the additive base is reduced to a substantially neutral vale during simultaneous precipitation of possible remains of undissolved calcium hydroxide.

3. Method according to claim 2, wherein the pH value of the additive base is in the range of 6.9–7.6 when it is added to the scrubber fluid.

4. Method according to claim 2, wherein the amount of clean gas which is added to the additive base is controlled by measuring the pH value of the additive base immediately before introduction into the scrubber fluid.

5. Method according to claim 3, wherein the amount of additive base introduced into the scrubber fluid is controlled by measuring the pH value of the scrubber-fluid.

6. Apparatus for cleaning the flue gas from a boiler and recovery of heat from said flue gas, whereby the flue gas is led from the boiler through a heat exchanger for water, and at least one of an economizer and heat exchanger, and is subsequently washed with a scrubber fluid withdrawn from a sedimentation tank and then returned to said sedimentation tank, and means for recycling the thermal energy collected in the scrubber fluid, the apparatus comprising:

means for feeding the flue gas through the economizer in such a manner that the flue gas still has a temperature above an acid dew point when the flue gas meets the scrubber fluid in a scrubbing element, means for measuring the pH value of the scrubber fluid and determining the addition of a liquid additive base from a tank so that the scrubber fluid is maintained substantially neutral, means for connecting the tank to a high-speed reactor, said high-speed reactor being supplied with precipitated sediment and liquid from the sedimentation tank in that sediment and liquid is led down through a substantially vertical downpipe together with a lime-water suspension from a mixing vessel.

7. Apparatus according to claim 6, wherein a sieve is arranged upstream of the vertical downpipe, a lower portion of the high-speed reactor includes a concave shield which is hit by a water/sediment jet and turns the stream upwards, and in that lime water is added to the water/sediment jet through the sieve by means of a dosing pump which is controlled by a pH sensor in the high-speed reactor in such a manner that the pH value in the high-speed reactor is held at approx. 9.0.

8. Apparatus according to claim 7, wherein a clean gas take-off supplies clean gas extracted from a chimney via pipelines to the additive base, said base being stored in at least one collection vessel disposed between the high-speed reactor and the tank, after which the clean gas is returned to the chimney.

9. Apparatus according to claim 8, wherein the tank, in which the additive base is collected before being introduced into the scrubber fluid, comprises a measuring element for the measurement of pH value, said measuring element being used to control a regulation element for the amount of clean gas which is added to the collection vessel.

10. Apparatus according to claim 9, wherein the sedimentation tank contains a device for measuring pH value, and the introduction of the additive base is controlled by the result of the measurement.

11. Apparatus according to claim 9, wherein the sediment from the at least one collection vessel and from the high-speed reactor is led to a centrifuge and the centrifuged liquid is returned to the system and the substantially dry sludge from the centrifuge is collected in a container.

12. Apparatus according to claim 6, characterized in that the sedimentation tank, the scrubber element and the remaining parts which come into contact with the scrubber fluid, e.g. the flushing jets, scrubber elements etc., are made of or cased with glass, porcelain or other acid-proof or base-proof material.

13. Method according to claim 1, wherein the pH value is approximately 9.5.

14. Apparatus according to claim 11, wherein the centrifuge is a decanter centrifuge.

15. Apparatus according to claim 14, wherein a plurality of collection vessels are disposed between the high-speed reactor and the tank.

16. Apparatus according to claim 15, wherein the centrifuged liquid is returned to the high-speed reactor of the system.

* * * * *